United States Patent Office 2,870,032
Patented Jan. 20, 1959

2,870,032

REFRACTORY GUNNING COMPOSITION AND METHOD OF PRODUCING THE SAME

Louis J. Jacobs, Chicago, Ill., assignor to The S. Obermayer Co., Chicago, Ill., a corporation of Ohio No Drawing. Application June 11, 1956
Serial No. 590,378

12 Claims. (Cl. 106—67)

This invention relates to refractory materials for use in monolithic construction work. More particularly, it relates to a so-called gunning mixture of such materials, that is, a mixture of refractory materials which is suitable for spraying from a spray gun to provide a monolithic refractory construction of high quality and economy.

The present application is a continuation-in-part of my co-pending application Serial No. 385,033, filed on October 8, 1953, now abandoned, which was in turn a continuation-in-part of application Serial No. 178,551, filed August 9, 1950, now abandoned.

The formulation of refractory materials is a difficult problem, because attempts to improve a certain characteristic frequently result in aggravated defects in other characteristics. This problem is particularly difficult of solution when the material is to be applied through a spray gun.

Heretofore, materials of this type frequently failed to adhere when projected against a wall or the like. This is a condition which is known as "rebound" and which results in the complete or partial loss of large quantities of refractory material. Also, even if such materials did adhere to the surface, they frequently failed to knit together properly and to form a dense, non-porous coating. These materials also tended to shrink excessively upon the original firing of the refractory structure constructed from them, thereby tending to induce cracking of refractory linings or distortion of structures or both.

Another important problem encountered with prior materials is that gunning of the mixture frequently could be continued without apparent difficulty for only about 15 to 20 minutes. Then, the spray nozzle would suddenly clog. Such clogging was frequently so serious that a mere blast of spray fluid was insufficient to correct the situation, and the gun had to be disassembled and cleaned.

Many attempts have been made to correct one or more of these defects. For example, in an attempt to decrease the amount of rebound the amount of water added at the spray nozzle was increased. However, by doing this, the adhering refractory material was thereby made substantially less dense and had a substantially greater tendency to shrink and to crack.

Binder materials, which are well known in this art, were added in an attempt to improve adhesion while not interfering with the knitting together of the structure. However, the clogging difficulties in the gun were increased.

It is an object of the instant invention to provide an improved refractory gunning composition.

It is a further object of the instant invention to provide a refractory gunning composition which adheres to the wall or target against which it is directed and knits together properly to form a dense coating.

A still further object of the instant invention is to provide a refractory gunning composition which does not crack or shrink excessively, upon the firing of the monolithic structure which is formed.

A further object of the instant invention is to provide a non-agglomerating refractory gunning composition which does not clog the spray gun.

These and other objects of the invention will become more apparent from the description following.

The instant improved refractory gunning composition is a mixture of individual, non-agglomerated particles comprising coarse grains of non-plastic refractory coated first with sticky plastic bond clay and then with a dry mixture of bond clay and fine grains of non-plastic refractory.

The novel method for producing the instant refractory involves two separate mixing steps. During the first step or mixing operation, coarse refractory particles are mixed with bond clay which has been moistened with enough water to make the bond clay sticky. Preferably, wetting of the bond clay is facilitated by using water containing a wetting agent. Sufficient sticky bond clay is used to completely coat the coarse grains.

Generally, the ratio by weight of bond clay and coarse grains in the first mixing step is between about 1:4 and about 1:15.

By the term "coarse grains" as used herein is meant clay particles having a size between about 3 and about 30 mesh.

The coarse refractory grains used in the instant invention are non-plastic type clays, such as calcined flint clay, i. e., a hard flint-like fireclay occurring as an unstratified massive rock, practically devoid of natural plasticity and showing a conchoidal fracture. Other non-plasic materials suitable for use as the coarse fraction include calcined fireclay, pyrophyllite, silica or chrome ore.

The bond clay used is a plastic fireclay and is designated C-71-51 by the American Society of Testing Materials, which in its "Manual on ASTM Standards on Refractory Materials" (published by ASTM, Philadelphia, 1952 edition) at page 130 defines a plastic fireclay as "a fireclay of sufficient natural plasticity to bond non-plastic materials." The bond clay used in the preparation of the instant gunning composition of the invention is preferably the type mined in Kentucky and Ohio, and is preferably ground to pass a 16 mesh sieve.

The wetting agent is mixed with the bond clay and water in order to lower the surface tension of the water so it will moisten the bond clay faster and develop a maximum of stickiness with a minimum amount of water.

The example given below employs as the wetting agent the product "Santomerse S" (an alkylated aryl sulfonate) manufactured and sold by the Monsanto Chemical Company. However, it is obvious to anyone skilled in the art that other surface active wetting agents can be used.

The amount of water used in this step obviously varies with the characteristics of the particular bond clay. However, the amount of water used should be no more than that sufficient to moisten the bond clay and make it sticky and plastic.

The coarse grains are mixed with the sticky bond clay until completely coated therewith. The length of time necessary for this mixing depends upon the efficiency of the mixer. However, with most heavy muller type mixers, the step is complete within about 5 to about 15 minutes.

In the second step, the sticky bond clay-coated coarse particles are mixed to completely coat them with a mixture of dry dusty bond clay and fine grains of refractory. This mixing is generally completed in from about 1 to about 5 minutes. In this step in which the surface of the coated sticky coarse grains are rendered non-sticky, the dry bond clay is used to produce material which will not agglomerate. The fine grains are used in this step to reduce the drying and firing shrinkage of the product.

The fine grains used are of a non-plastic clay, such as a calcined fireclay, or pyrophyllite, or silica, or chrome ore.

The particle size of the fine grain refractory should always be smaller than 15 mesh but varies, and the size of the fine grains depends upon the size of the particles in the coarse grain fraction. The fine grains are preferably of such size as to pass through a sieve at least about 10 mesh sizes smaller than the mesh size of the smallest of the particles in the coarse grain fraction. For example, if the clay particles of the coarse fraction have a mesh size between about 3 to about 30 mesh, the fine grains should all be smaller than about 40 mesh. But when the mesh size of the coarse grains is between about 3 to about 10 mesh, the fine grains are preferably at least smaller than about 20 mesh. In the preferred embodiment the ratio by weight of the amount of coarse grains used in the primary coating step to the amount of fine grains used in the secondary coating is between about 2:1 and about 4:1.

In the second mixing step, the quantity by weight of fine grains is substantially less than the quantity by weight of coarse grains used in the first step. The ratio by weight of fine grains to coarse grains is between about 1:2 and about 1:4. However, the number of particles of fine grains is substantially greater than the number of coarse grains.

The amount by weight of bond clay added with the fine clay particles in the second step is substantially greater than employed in the primary mixing step. Generally the ratio by weight of bond clay used in the first and second mixing steps is between about 1:15 and about 1:5.

In the second step, if an amount of bond clay less than the lower limit of the above range is employed, the coating of the coarse grains is insufficient, and agglomeration and jamming of the composition in the spray gun may occur. If an amount of bond clay greater than the upper limit is used, excessive shrinkage of the completed structure will occur.

Theoretically, it might be considered necessary to have a relatively large quantity of bond clay for the relatively heavy weight of coarse grains. In practice, I have found that this is not so; and that, on the contrary, it is a feature of the instant process that by far the greater quantity by weight of bond clay is admixed only in a second step, wherein the fine flint clay is mixed with the precoated coarse particles.

The gunning compositions obtained by the instant process have the following compositional limits by weight:

| | Percent |
|---|---|
| Coarse clay fraction | 40–78 |
| Fine clay fraction | 10–35 |
| Bond clay | 15–35 |
| Wetting agent | 0 to 0.5 |

In the instant composition the ratio of the total refractory grains to plastic bond clay used should be within the range of 2:1 to 4:1. If the ratio of refractory grains to plastic bond clay exceeds about 4:1, the resulting mixture will not agglomerate properly when sprayed, and cracking will occur in the completed monolithic structure. If the ratio of refractory grains to plastic bond clay is less than about 2:1, the completed monolithic structure will have insufficient strength and excessive shrinkage will occur. In addition, jamming in the spray gun may occur.

While the wetting agent is not indispensable, it is preferable to use it, because it results in more rapid and thorough moistening of the bond clay, together with increased plasticity thereof, and a generally superior final product. Ordinarily from 0.03% to 0.15% dry solids wetting agent is sufficient, computed on the total weight of the gunning composition. A larger quantity of wetting agent is usually useless and of course is economically undesirable.

If desired, it is also possible to add other materials to the composition. For example, a binding agent, such as lignin sulfonate, can be added to the first or second mix, in accordance with a practice frequently used in this art. However, only a small amount should be used. Although the binder improves the anti-rebound and similar functions slightly, it has often been found to lead to difficulties in connection with the clogging of the gun. In practicing the instant invention, it is preferred to omit binding agents.

The ingredients contained in the ultimate product are those employed in the two successive steps of the manufacturing procedure; the composition being a purely physical mixture of the different sizes of non-plastic particles, the bond clay, absorbed water, and the wetting agent. The physical form and condition of the material and of the particles thereof are different from those previously known in gunning compositions.

As indicated above, an easily recognizable feature of the new composition is that it substantially consists of an aggregate of separate non-agglomerated particles. Each of these separate particles has an inner grain of coarse non-plastic clay and an individual coating of bond clay admixed with fine grains of non-plastic clay. It is this separate and individual character of the particles which allows for smooth and efficient gunning and the ultimate formation of a proper monolithic mass.

The particles produced by the two-step mixing process are substantially free from any tendency to agglomerate with one another while being stored in the normal manner. The strong impact caused by spraying is necessary to cause the ultimate cohesion and agglomeration of the mass. This impact does not interfere with the ideal arrangement of flint clay and bond clay, wherein the fine flint clay grains are embedded in thin, coherent layers of bond clay between the coarse flint clay grains.

To more clearly illustrate the character of the instant invention, but with no intention to be limited thereto, the following example is given:

EXAMPLE I

Eight separate batches of refractory gunning composition were prepared using the quantities of the materials shown in Tables I and II below:

*Table I*

| | I | II | III | IV | V | VI | VII | VIII |
|---|---|---|---|---|---|---|---|---|
| Coarse grains, pounds | 560 | 560 | 560 | 500 | 500 | 750 | 400 | 500 |
| Bond clay, pounds | 50 | 80 | 100 | 50 | 100 | 50 | 100 | 100 |
| Wetting agent 30% solids content, pints | 3 | 3 | 3 | 3 | 3 | 1 | 2 | 2 |
| Water gallons | 1 | 1¼ | 1¾ | 1 | 1½ | 1 | 2 | 2 |

*Table II*

| | I | II | III | IV | V | VI | VII | VIII |
|---|---|---|---|---|---|---|---|---|
| Fine grains, pounds | 190 | 190 | 190 | 300 | 200 | 100 | 300 | 150 |
| Bone clay, pounds | 200 | 170 | 150 | 150 | 200 | 100 | 200 | 250 |

Table I gives the quantity of materials used in the primary mixing step. In this step, comminuted calcined flint clay, having a size between 3 and 10 mesh, was mixed with plastic bonding fireclay, ground to pass a 16 mesh size sieve, water, and wetting agent (Santomerse S), for about 7 minutes. This mixing produced masses of coarse particles completely coated with a sticky layer of bond clay.

Table II shows the amount of the materials used for the respective batches in the secondary mixing step. In this step, the sticky grains produced in the first step were mixed for about two minutes with an additional quantity of bond clay and with calcined flintclay comminuted to a size smaller than 20 mesh.

Thus, it will be seen that the process comprises first, a relatively long mixing operation for the heavy mass of coarse grains together with a relatively small amount of bond clay, water, and wetting agent; and second, a relatively short mixing operation for the resulting coated grains with the fine grains and relatively large amount of bond clay.

Table III shows the percentages by weight of the total plastic bond clay, the coarse fraction and the fine fraction of non-plastic clay grains in the above gunning compositions.

Table III

|  | I | II | III | IV | V | VI | VI | VIII |
|---|---|---|---|---|---|---|---|---|
| Coarse grains (percent) | 56 | 56 | 56 | 50 | 50 | 75 | 40 | 50 |
| Fine grains (percent) | 19 | 19 | 19 | 30 | 20 | 10 | 30 | 15 |
| Bond clay (percent) | 25 | 25 | 25 | 20 | 30 | 15 | 30 | 35 |

From the above description and tables, it is obvious that the procedure and amounts of the constituents can be varied while still producing a novel refractory gunning composition of improved characteristics coming within the scope of the instant invention.

Having thus fully described and illustrated the character of the instant invention, what is desired to be protected by Letters Patent is:

1. A refractory composition consisting essentially of between about 40% and about 78% by weight of coarse grains of refractory clay, between about 10% and about 35% by weight of fine grains of refractory clay, between about 15% and about 35% by weight of bond clay, up to about 0.5% by weight of wetting agent, and a small amount of water, and wherein each coarse grain has a primary coating of moistened bond clay and an exterior coating of dry bond clay and said fine grains.

2. The product of claim 1 wherein the coarse grains are between about 3 and about 10 mesh size, and substantially all of the fine grains are smaller than about 20 mesh.

3. A method for producing a non-agglomerated refractory composition which comprises coating coarse grains of refractory material with plastic bond clay moistened with water and a wetting agent, thereby producing coarse grains having a sticky coating of the clay, and coating said sticky coarse grains with a dry mixture of fine grains of refractory material and plastic bond clay.

4. The method as described in claim 3 wherein the ratio by weight of plastic bond clay employed in the first and in the second mixing steps is between about 1:1.5 and about 1:5.

5. The method as described in claim 3 wherein the ratio by weight of coarse grains to fine grains is between about 2:1 and about 4:1.

6. A method for producing a refractory composition which comprises coating an aggregate of coarse grains of refractory material with plastic bond clay moistened with water and wetting agent to produce a primary sticky coating, and coating the particles in the resulting mass with a dry mixture of plastic bond clay and fine refractory grains, the ratios by weight employed of coarse to fine grains and of refractory grains to bond clay being both between about 2:1 and about 4:1, and the ratio by weight of bond clay used in the primary and in the secondary coatings being between about 1:1.5 and about 1:5.

7. A refractory composition consisting essentially of between about 40% and about 78% by weight of coarse grains of refractory clay, between about 10% and about 35% by weight of fine grains of refractory clay, between about 15% and about 35% by weight of bond clay, and a small amount of water, and wherein each coarse grain has a primary coating of moistened bond clay and an exterior coating of dry bond clay and said fine grains.

8. A refractory composition consisting essentially of an aggregate of coarse grains of refractory material, each of said grains having a primary coating of moistened plastic bond clay, and an exterior coating of dry bond clay and fine grains of refractory material, and wherein the ratio by weight of coarse to fine grains is between about 2:1 and about 4:1, and the ratio by weight of refractory grains to bond clay is between about 2:1 and about 4:1.

9. A method for producing a non-agglomerated refractory composition which comprises coating coarse grains of refractory material with moistened plastic bond clay, thereby producing coarse grains having a sticky coating of the clay, and coating said sticky coarse grains with a dry mixture of fine grains of refractory material and plastic bond clay, the ratio by weight of refractory grains to plastic bond clay being between about 2:1 and about 4:1.

10. A refractory composition consisting essentially of about 55% by weight dry solids of coarse grains of refractory clay, about 20% by weight dry solids of fine grains of refractory clay, and about 25% by weight dry bond clay, wherein the coarse grains are covered with a primary coating of moistened bond clay and an exterior coating of dry bond clay and said fine grains.

11. A method for producing a non-agglomerated refractory composition which comprises coating coarse grains of refractory material with plastic bond clay moistened with water and a wetting agent, thereby producing coarse grains having a sticky coating of said clay, and coating the sticky coarse grains thus formed with a dry mixture consisting essentially of plastic bond clay and fine grains of refractory material.

12. A refractory composition consisting essentially of between about 40% and about 78% by weight refractory clay in coarse grains, between about 10% and about 35% by weight of refractory clay in fine grains, between about 15% and about 35% by weight of bond clay, up to about 0.5% by weight of wetting agent, and a small amount of water, and wherein substantially all of the coarse grains of refractory clay have a primary coating of moistened bond clay and an exterior coating consisting essentially of dry bond clay and said fine grains of refractory clay.

References Cited in the file of this patent

UNITED STATES PATENTS

| 2,425,152 | Greger et al. | Aug. 5, 1947 |
| 2,460,268 | Kauffman et al. | Feb. 1, 1949 |
| 2,543,548 | Henry | Feb. 27, 1951 |